United States Patent [19]

Shimizu

[11] Patent Number: 4,544,956

[45] Date of Patent: Oct. 1, 1985

[54] IMAGE INFORMATION REGISTERING/RETRIEVING SYSTEM

[75] Inventor: Makoto Shimizu, Tokyo, Japan

[73] Assignee: Tokyo Shibaura Denki Kabushiki, Kawasaki, Japan

[21] Appl. No.: 593,306

[22] Filed: Mar. 26, 1984

[30] Foreign Application Priority Data

Mar. 30, 1983 [JP] Japan .................................. 58-54331

[51] Int. Cl.⁴ .............................................. H04N 1/27
[52] U.S. Cl. .................................... 358/296; 364/518; 364/519
[58] Field of Search .............................. 358/296, 280; 364/518–519, 521–523

[56] References Cited

U.S. PATENT DOCUMENTS 4,485,411 11/1984 Yamamoto .......................... 358/296

Primary Examiner—Thomas H. Tarcza
Attorney, Agent, or Firm—Cushman, Darby & Cushman

[57] ABSTRACT

An image information registering/retrieving system comprises an optical disk for registering image information and for registering retrieving data, a magnetic disk for storing the retrieving data, and a control circuit for controlling the registering and retrieving operations. When the magnetic disk loses its function and is replaced by a new one, the retrieving data on the optical disk is copied on the new magnetic disk.

2 Claims, 6 Drawing Figures

IMAGE INFORMATION REGISTERING/RETRIEVING SYSTEM

BACKGROUND OF THE INVENTION

The present invention relates to an image information registering/retrieving system, and more particularly to an image information registering/retrieving system of the type in which a plurality of image information on documents is successively registered on an optical disk and a plurality of retrieving data corresponding to the image information is stored on a magnetic disk, and any desired image information is read out using a retrieving data associated with the desired image information.

In an image information registering/retrieving system which is known and practically used, a plurality of image information is obtained by optically scanning documents and registering on an optical disk. A plurality of retrieving data for retrieving the image information is stored on a magnetic disk. A control unit controls the optical disk and the magnetic disk. Selected retrieving data in the magnetic disk is read out and applied to the control unit. Using the selected retrieving data, the control unit specifies that location of the optical disk on which the desired information is registered, and reads out the desired image information therefrom. The readout image information is visualized by a CRT display or recorded by a recording device.

The image information registering/retrieving system having the above described functions requires a magnetic memory device for driving the magnetic disk. When used for a long time, the magnetic disk wears down and possibly loses its function. In such a case, it is not possible to read out the retrieving data therefrom, resulting in that the functions of the image information registering/retrieving system per se stop. To cope with this, the prior system is provided with an auxiliary magnetic memory device. This leads to an increase in the cost of manufacture, however. To avoid the increased cost, the magnetic memory device may be designed such that the defective magnetic disk is replaced with a new disk. This approach indeed succeeds in restricting the increase of cost to some degree. Nevertheless, it takes a long time to store the retrieving data onto the new magnetic disk. In this respect, this approach is not practical. A more serious disadvantage of the approach is that it is very difficult to keep the predetermined correspondence between the retrieving data on the magnetic disk and the image information registered in the optical disk.

SUMMARY OF THE INVENTION

Accordingly, an object of the present invention is to provide an image information registering/retrieving system in which the optical disk (first storing medium) is registered with a plurality of image information and a plurality of retrieving data with a corresponding relationship therebetween, and, when the magnetic disk loses its function and is replaced by a new magnetic disk, the retrieving data registered on the optical disk is copied on the new magnetic disk.

To be more specific, an image information registering/retrieving system according to this invention comprises a first information-storing medium on which a plurality of image information and a plurality of retrieving data for reproducing the image information are registered, each of the retrieving data being in correspondence with the corresponding image information, a second information-storing medium on which the plurality of retrieving data is stored, and means for controlling the first information-storing medium and the second information-storing medium in such a manner that the plurality of retrieving data registered on the first information-storing medium is copied onto another second information-storing medium when the second information-storing medium loses its function and is replaced by the another second information-storing medium.

With such an arrangment, there is no need for an additional magnetic storing device. When a magnetic disk (a second information storing medium) is replaced by a new magnetic disk, the retrieving data registered on the optical disk is transferred to the new magnetic disk. The transferred retrieving data maintains the predetermined correspondence between the image information and the retrieving data.

DETAILED DESCRIPTION OF THE PREFERRED EMBODIMENTS

Figure 1:
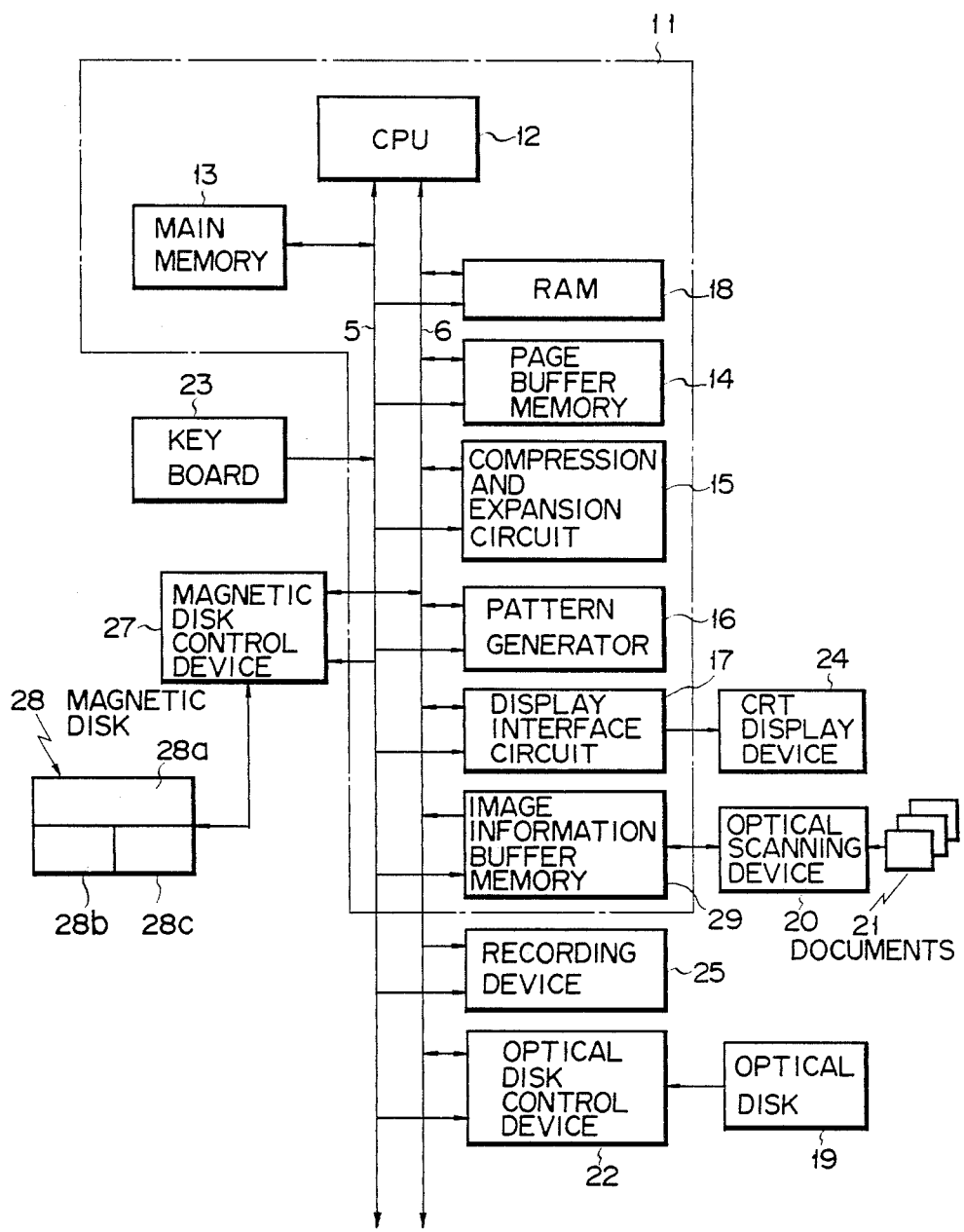
FIG. 1 is a block diagram of an embodiment of an image information registering/retrieving system according to the present invention.

A configuration of an embodiment of an image information registering/retrieving system according to the present invention, will be described referring to FIG. 1. In the figure, the image information registering/retrieving system includes a main control section 11. In the main control section 11, a CPU 12 is coupled with buses 5 and 6; a main memory 13 is connected to the bus 5; a page buffer memory 14, having a memory capacity of at lest one unit of image information (corresponding to the image information of one page of document), is connected to the buses 5 and 6; a compression/expansion circuit 15 is connected to the buses 5 and 6, the circuit 15 compresses image information and expands the compressed one into an unexpanded state by employing the modified Hoffman method; a pattern generator 16 is connected to the buses 5 and 6 to store various types of characters and symbols; a RAM (random access memory) 18 is connected to the buses 5 and 6; a buffer memory 29 for temporarily storing information is connected to the buses 5 and 6; and a display interface circuit 17 is connected to the buses 5 and 6. The buses 5 and 6 are coupled, at the other ends, with an external device (not shown). An optical scanning device 20 is coupled with the image information buffer memory 29. The device 20 two-dimensionally scans the documents 21 sheet-by-sheet with a laser beam to obtain the image information on the documents, converts the image information into corresponding electrical signals, and loads the electrical signals into the image information storing buffer memory 29. An optical disk 19 as a first information-storing disk is used to register pieces of information read out from the documents 21 and the data for retrieving the image information thereonto and to reproduce the registered image information and the registered retrieving data therefrom. Registration and reproduction on or from the optical disk 19 are controlled by the optical disk control device 22 which is connected to the buses 5, 6 and coupled to the optical disk 19. Connected to the output terminal of the display interface circuit 17 is a CRT (cathode ray tube) display 24. The CRT display 24 visualizes the image information which has been optically obtained from the documents, and which has been appropriately controlled and processed by the main control section 11. Of course, the CRT display 24 displays the image information and the retrieving data, which are read out from the optical disk 19 under the control of the optical disk control device 22. The display interface circuit 17 and the CRT display 24 cooperate to form a display device. A magnetic control device 27 is coupled with the buses 5 and 6. A keyboard 23 is connected to the bus 5. The keyboard 23 is used for inputting to the main control section 11 a retrieving code for reading out image information which corresponds to the retrieving code and required instruction data. A recording device 22 connected to the buses 5, 6 receives, through the main control section 11, the image information on the documents 21 obtained by the optical scanning device 20 and records the image information in the form of hard copy. The recording device 22 also receives, through the main control section, the image information and the retrieving data read out from the optical disk 19 by the optical disk control device 22 and records them in the form of hard copy.

Figure 2:
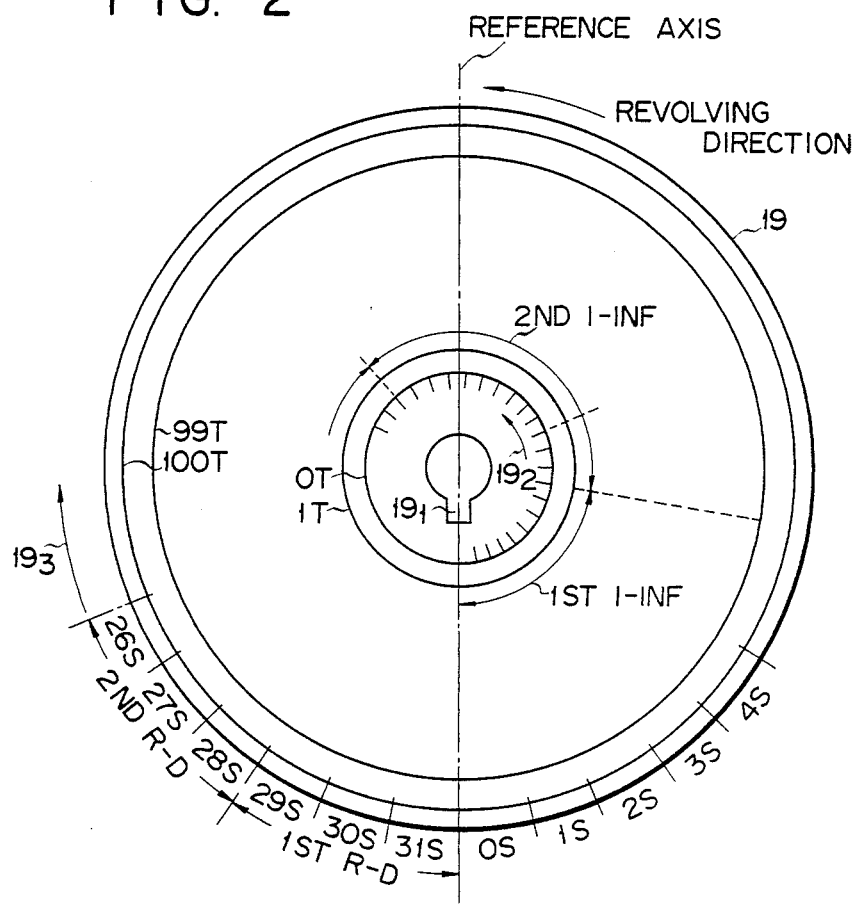
FIG. 2 is a plan view of an optical disk used in the system of FIG. 1 illustrating how the image information and the retrieving data are allocated on the optical disk.

The optical disk 19, as shown in FIG. 2, contains a circular disk made of glass or plastic which is coated with tellurium or bismuth. A hole centered in the disk is provided for inserting a shaft for rotating the disk in the direction of the arrow indicated. The hole has a cutaway portion $19_1$ to ensure that the disk is in the proper reference position. The surface of the optical disk 19 is segmented into a plurality of sectors 0S–31S which are numbered counterclockwise from the reference position as viewed in the drawing. The surface is further segmented into 100 registering trucks 0T–100T as numbered in the radial direction. Actually, these trucks are formed in a spiral fashion, but represented as coaxial rings in the diagram. More specifically, the first image information (I-INF), the second image information (I-INF) and so on are successively registered in the sectors on the truck marked 0T, the (I-INFs) being numbered counterclockwise, i.e. in the direction of the arrow $19_2$, from the reference axis. The first retrieving data (R - D) and the second retrieving data (R - D), and so on are successively registered in the sectors on the truck marked 100T, the (R - Ds) being numbered clockwise, i.e. in the direction of arrow $19_3$, from the reference axis.

Figure 4:
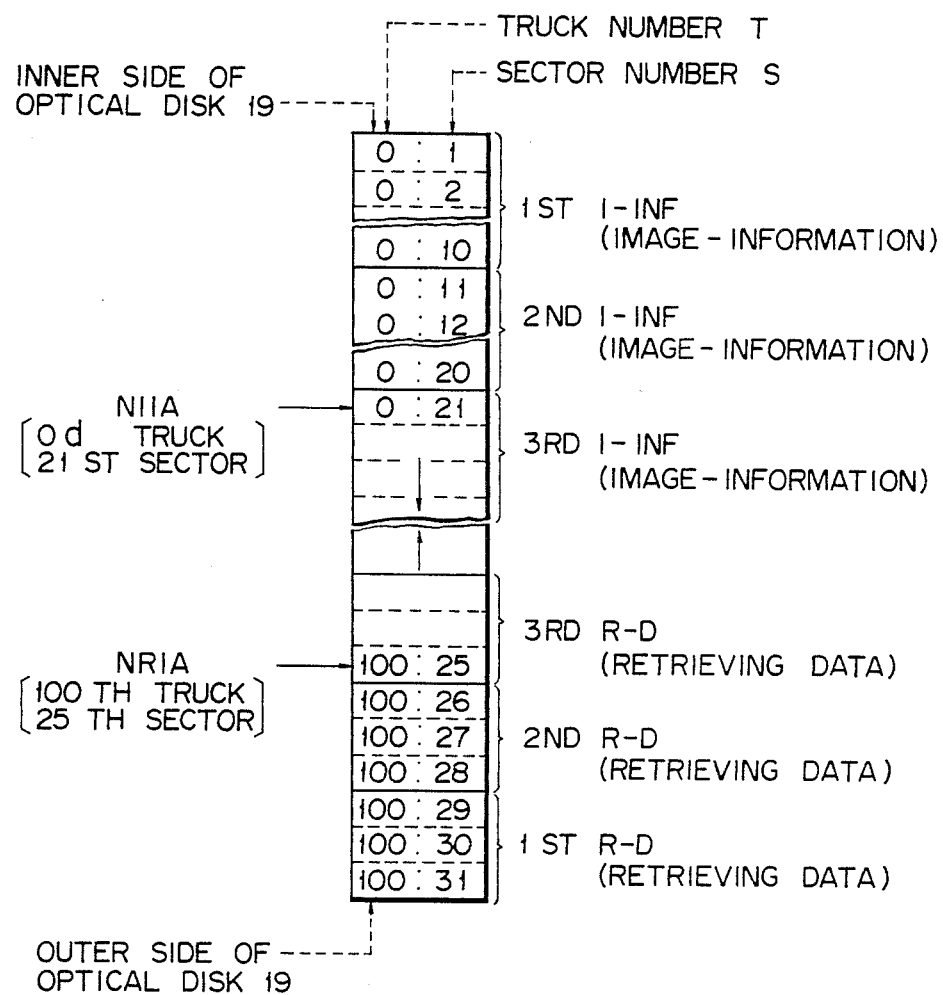
FIG. 4 shows a radially extending part of the registering surface of the optical disk, which illustrates in detail how the image information and the retrieving data are registered on the optical disk.

In FIG. 4, there is shown the radially elongated recording area of the optical disk 19. FIG. 4 typically illustrates how image information and retrieving data are allocated in the memory area of the optical disk 19. As shown, the first (I-INF) occupies the 0d to 10th sectors in the 0d truck, and the second (I-INF) occupies the 11th to 20th sectors in the 0d truck. On the other hand, the 1st (R - D) is registered in the 29th to 31st sectors in the 100th truck, and the 2nd (R - D) in the 26th to 28th sectors in the 100th truck.

Figure 3:
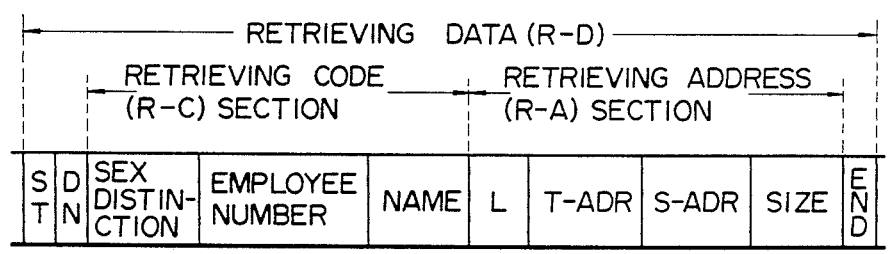
FIG. 3 illustrates a format of the retrieving data.

In FIG. 3, the data format of the retrieving data is shown. As shown, the retrieving data (R - D) is composed of a start (ST) field, a direct number (DN) field representing, for example, a serial number assigned to the image information, a retrieving code (R - C) section, a retrieving address (R - A) section, and an end (END) field. The retrieving code section contains a sex distinction field, an employee number field, and a name field. The address section contains a field L representing the number L of sectors occupied by the image information as denoted by the retrieving code (R - C). A T-ADR (truck address) field represents the initial truck number in which the start portion of the image information corresponding to the retrieval code (R - C) is registered. An S-ADR (sector address) field represents the initial sector number which represents the initial sector number in which the start portion of the image information corresponding to the retrieval code (R - C) is registered, and a SIZE field represents the image size (the number of bytes constituting the image information corresponding to the retrieving code (R - C)).

Returning to FIG. 1, the magnetic disk 28 is composed of a first storing area 28a for storing the retrieving data, a second storing area 28b in which an address data NIIA (next image information address) is stored, the NIIA representing an initial truck number and an initial sector number in which the start portion of image information next to the image information corresponding to the retrieving code (R - C) is stored, and a third storing area 28c in which an address data NRIA (next retrieving data initial address) is stored, the NRIA representing an initial truck number and an initial sector number in which the start portion of retrieving data next to the retrieving code (R - C) is stored. To be more specific, it is assumed that, as shown in FIG. 4, first and second image information (I-INF) and first and second retrieving data (R - D) have been registered. Then, NIIA represents the address (0: 21) (0d truck: 21th sector) which is next to the last address (0: 20) of the second (I-INF) and the top address (0: 21) of the third (I-INF). Also, NRIA represents the address (100; 25) (100th truck: 25th sector) which is next to the last address (100: 26) of the 2nd (R-D) and the top address (100: 25) of the 3rd (R-D).

Figure 5A:
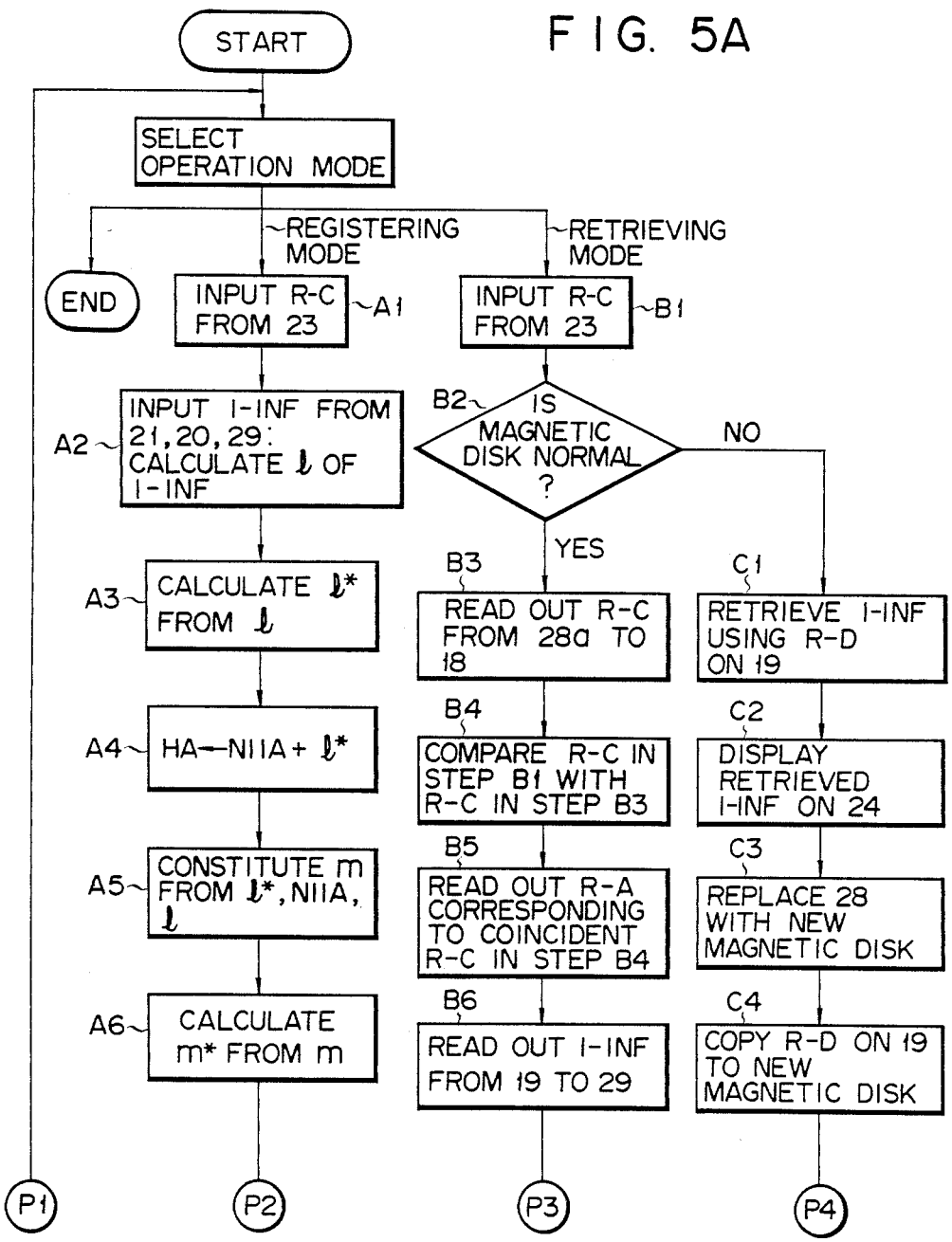
FIGS. 5A and 5B show flow charts useful in explaining the operation of the system of FIG. 1.
Figure 5B:
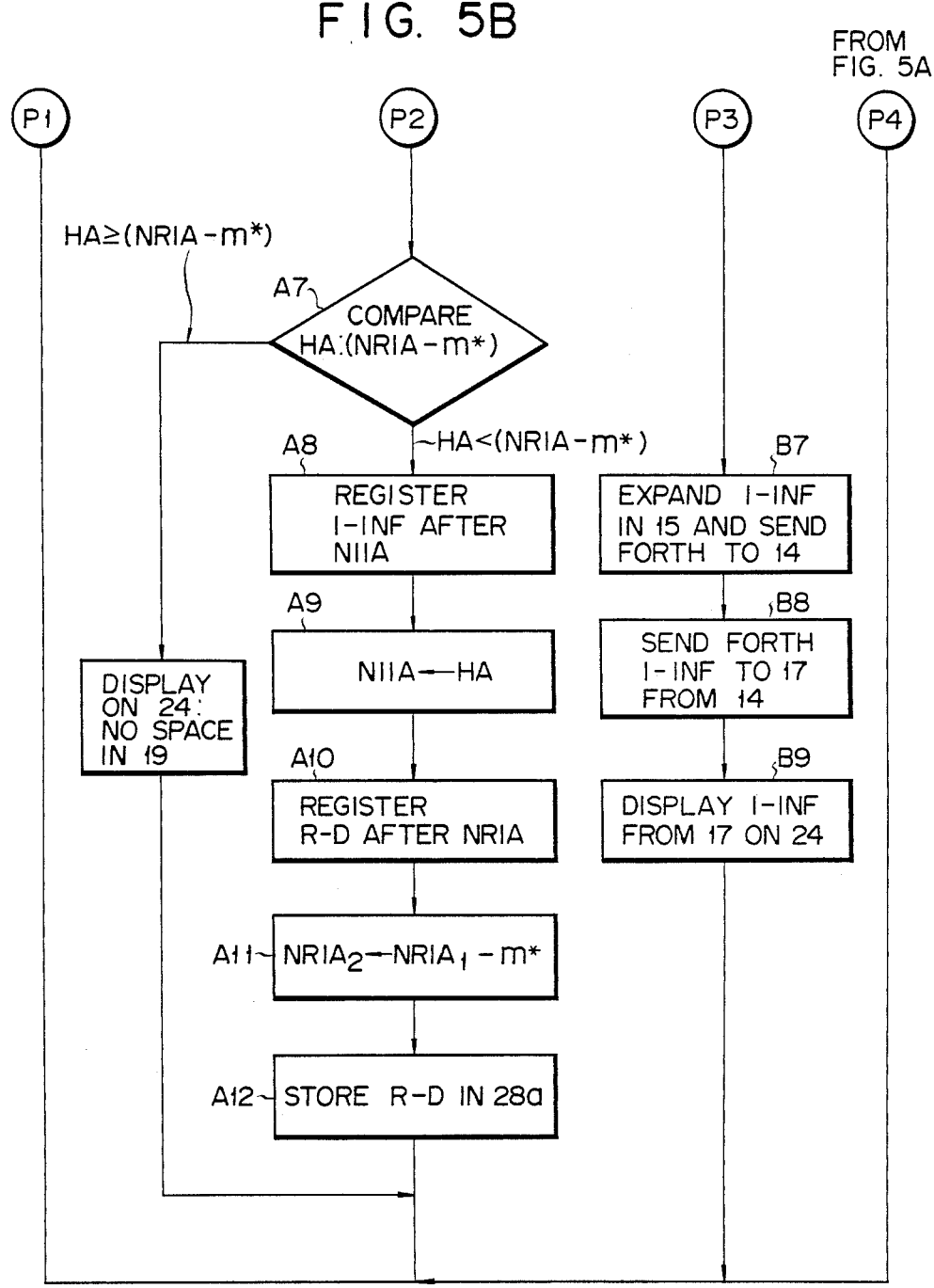

The operation of an image information registering-/retrieving system thus arranged will be described referring to flow charts shown in FIGS. 5A and 5B. To begin with, the main control section 11 is driven and the keyboard 23 is operated to select the desired operation mode. It is assumed now that a registering mode is selected. In this mode, the first (I-INF) (image information), the second (I-INF), etc. and the first (R - D) (retrieving data), the second (R - D), etc. are registered onto the sectors of a truck (for example, 0d truck) on the optical disk 19, as shown in FIG. 4. In the registering mode, data to be registered on the optical disk 19 will use only the first and second (I-INFs) and the first and second (R - Ds), for simplicity of explanation. In step A1, an operator operates the keyboard 23 to enter the first (R - C) (retrieving code shown in FIG. 3) into the main control section 11. In step A2, the CPU 12, upon receipt of the (R - C), controls the optical scanning device 20 to scan one of the documents 21 to obtain the first (I-INF) from the document and to input the first (I-INF) into the main control section 11. In this step A2, the length l of the first (I-INF) is calculated. In the next step 3A, the CPU 12 calculates 1* using the length 1. The 1* indicates the number of trucks and the sectors necessary for registering the image information having the length 1. In step A4, HA is calculated on the basis of NIIA+1*. The NIIA indicates the top address of the 1st (I-INF) and the HA represents the top address of the second (I-INF). In step A5, the retrieving data m is constructed by coupling the 1* obtained in step A3, the NIIA in the 1st (I-INF), and the 1 obtained in step A2. In step A6, m* is calculated using m[1st (R - D)]obtained in step A5. The symbol m* represents the number of trucks and sectors necessary for registering the first (R - D) with a length of m. In step A7, the head address HA of the second (I-INF) obtained in step A4 is compared with (NRIA−m*), where NRIA is the top address of the second (R - D). In step A7, when HA<(-NIRA−m*), step A8 is executed. When HA≧(NRIA−m*), the CRT display 24 indicates that no space for registering is left on the optical disk 19. In step A8, the first (I-INF) is registered using the address NIIA as a top address. In step 9, the address NIIA of the second (I-INF) is calculated using the address HA of the second (I-INF) obtained in step A4. In step A10, the first (R - D) is registered using the address NRIA as a top address. In step A11, NRIA$_2$ is obtained using (NRIA$_1$−m*). NRIA$_1$ indicates the top address of the first (R - D). NRIA$_2$ indicates the top address of the second (R - D) and m* indicates the data obtained in step A6. In step 12, the first (R - D) is stored into the retrieving data storing area 28a of the magnetic disk 28. For registering the first (I-INF), the second (I-INF), etc. on the optical disk 19 and for storing the first (R - D), the second (R - D), etc. on the mangetic disk 28, it is suficient that steps A1 to A12 be repeated.

The retrieval mode will be described referring to steps B1 to B9, assuming that this mode is selected by operating the keyboard 23. In this case, it is assumed that the second (I-INF) which has been registered on the optical disk 19 is retrieved.

In step B1, a second (R - C) (retrieving code) is keyed in on the keyboard 23. In step B2, it is judged whether the operation of the magnetic disk 28 is normal or not. When it is normal (YES), the operation advances to step B3. In step B3, the first (R - C), the second (R - C), and so on, are successively read out from the memory area 28a of the magnetic disk 28, and are loaded into the RAM 18. In step B4, the (R - Cs) read out from the RAM 18 are successively compared with the (R - C) already input in step B1. In this example, the second (R - C) of the second (R - D) is input in step B1. Therefore, a coincidence is set up with the second (R - C). In step B5, the second (R - A) (retrieving address) corresponding to the second (R - C) is read out from the areas 28b and 28c of the magnetic disk 28. In step B6, with the second (R - A), the second (I-INF) is read out from the optical disk 19 and loaded into the image information buffer memory 29. Since the second (I-INF) contains compressed image information, the second (I-INF) must be expanded by the compression/expansion circuit 15 and loaded into the page buffer memory 14. This operation is done in step B7. In step B8, the second (I-INF) is expanded and transmitted to the display interface circuit 17. In step B9, the expanded second (I-INF) is displayed on the CRT display 24. Subsequently, through steps similar to the above, a desired (I-INF) is read out from the optical disk 19, displayed on the CRT display 24 or recorded by the recording device 25.

The following is a description of operating an abnormal magnetic disk 28, that is operating a magnetic disk 28 when the CPU 12 judges that it is impossible to normally read out the (R - C) or the (R - D) from the magnetic disk 28. This operation proceeds through steps C1 to C4. In step C1, the image information is retrieved using the (R - Ds) registered on the optical disk 19. To be more specific, the CPU 12 reads out the (R - Ds) one-by-one from the optical disk 19 which is controlled by the optical disk control device 22, and stores the output into the RAM 18. Then, the (R - C) from the keyboard 23 is successively compared with the (R - Cs) read out from the RAM 18 to find the (R - C) from the keyboard 23 which are coincident with each other. The coincident (R - C) is used as an address to read out the image information as specified by the coincident address from the optical disk 19. In step C2, the read out image information is either displayed by the CRT display 24, or is recorded by the recording device 25. In step C3, the defective magnetic disk 28 is replaced with a new magnetic disk. In step C4, the (R - Ds) of the optical disk 19 are copied onto the new magnetic disk. Specifically, the CPU 12 controls the optical disk control device 22 to sequentially read out the (R - Ds) from the optical disk 19 and to store them in the area 28a of the magnetic disk 28. In this case, every time a (R - D) is read out from the optical disk 19, the addresses NIIA and NRIA corresponding to those (R - Ds) are counted to provide the corresponding memory locations in the memory areas 28b and 28c of the NIIA and NRIA.

Approximately 64,000 bytes are required for constructing the image information taken from an A4 size document and for recording them onto the optical disk 19. While approximately 100 bytes are required for registering the retrieving data associated with the image information.

Alternatively, the image information may be registered on the optical disk 19 from the peripheral side to the center, and the retrieving data may be registered from the center to the peripheral side.

Further, if a laser beam is used for registering the image information onto the optical disk 19, a high density registering is possible.

What is claimed is:

1. An image information registering/retrieving system comprising:
    a first information-storing medium on which a plurality of image information and a plurality of retrieving data for reproducing said image information are registered, each of said retrieving data being in correspondence with the corresponding image information;
    a second information-storing medium on which said plurality of retrieving data is stored; and
    means for controlling said first information-storing medium and said second information-storing medium in such a manner that said plurality of retrieving data registered on said first information-storing medium is copied onto another second information-storing medium when said second information-storing medium loses its function and is replaced by said another second information-storing medium.

2. An image information registering/retrieving system according to claim 1, wherein said first information-storing medium is an optical disk on which said information is registered by means of a laser beam, and said second information-storing medium is a magnetic disk.

* * * * *

UNITED STATES PATENT AND TRADEMARK OFFICE
CERTIFICATE OF CORRECTION

PATENT NO. : 4,544,956

DATED : October 1, 1985

INVENTOR(S) : SHIMIZU, M.

It is certified that error appears in the above-identified patent and that said Letters Patent is hereby corrected as shown below:

Title page:

The assignee should be shown as: TOKYO SHIBAURA DENKI KABUSHIKI KAISHA.

Signed and Sealed this

Eighteenth Day of March 1986

[SEAL]

*Attest:*

DONALD J. QUIGG

*Attesting Officer*  *Commissioner of Patents and Trademarks*